United States Patent
Ogatsu et al.

(10) Patent No.: US 8,300,401 B2
(45) Date of Patent: Oct. 30, 2012

(54) HOLDER OF MAGNETIC STORAGE APPARATUS, MAGNETIC STORAGE APPARATUS AND ELECTRIC DEVICE INCLUDING THE SAME

(75) Inventors: Toshinobu Ogatsu, Tokyo (JP); Kenichiro Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 235 days.

(21) Appl. No.: 12/735,979

(22) PCT Filed: Jan. 21, 2009

(86) PCT No.: PCT/JP2009/050835
§ 371 (c)(1),
(2), (4) Date: Aug. 30, 2010

(87) PCT Pub. No.: WO2009/116315
PCT Pub. Date: Sep. 24, 2009

(65) Prior Publication Data
US 2011/0002213 A1    Jan. 6, 2011

(30) Foreign Application Priority Data

Mar. 19, 2008 (JP) ................................. 2008-071437

(51) Int. Cl.
*G06F 1/16* (2006.01)
(52) U.S. Cl. ...................... 361/679.4; 600/436; 429/480; 711/170; 428/831
(58) Field of Classification Search .................. 600/437, 600/459, 436; 429/94, 421, 434, 524, 7, 429/224, 480; 360/97.01, 75, 55, 86, 313, 360/319, 324.12; 711/114, 165, 161, 170, 711/122; 428/828.1, 832.1, 831, 811.1; 365/158, 365/200, 170, 15, 12; 361/679.02, 679.31, 361/679.41, 679.08, 679.09, 679.55, 679.21, 361/679.26, 679.44, 679.43, 679.57, 679.06, 361/697, 801, 811
See application file for complete search history.

(56) References Cited

U.S. PATENT DOCUMENTS

| 2006/0002004 A1* | 1/2006 | Albrecht et al. ........... 360/97.01 |
| 2010/0310911 A1* | 12/2010 | Yamamoto et al. ............ 429/94 |
| 2011/0112399 A1* | 5/2011 | Willems et al. ............... 600/437 |

FOREIGN PATENT DOCUMENTS

| JP | 64-46284 A | 2/1989 |
| JP | 3-104079 A | 5/1991 |
| JP | 2002-358140 A | 12/2002 |
| JP | 2003-242764 A | 8/2003 |
| JP | 2004-139670 A | 5/2004 |
| JP | 2005-243233 A | 9/2005 |
| JP | 2006-164459 A | 6/2006 |
| JP | 2009-80919 A | 4/2009 |

* cited by examiner

*Primary Examiner* — Hung Duong
(74) *Attorney, Agent, or Firm* — McGinn IP Law Group, PLLC

(57) ABSTRACT

A holder of a magnetic storage apparatus is suggested that can efficiently absorb the shock when a vibration or shock is applied to the magnetic storage apparatus. A plurality of holding members (first shock absorbing material foam rubber 340 and second shock absorbing material foam rubber 350) that hold at least two corner parts of the magnetic storage apparatus 320 is included. The holding members are configured in a way that a total sum of holding power to hold one of opposite angles of the magnetic storage apparatus 320 and a total sum of holding power to hold the other of opposite angles are different. The first shock absorbing material foam rubber 340 is disposed on one of opposite angles, and the second shock absorbing material foam rubber 350 is disposed on the other of the opposite angles. The first shock absorbing material foam rubber 340 has greater hardness than the hardness of the second shock absorbing material foam rubber 350.

14 Claims, 17 Drawing Sheets

SHOCK DIRECTION

HARD   SOFT

SHOCK DIRECTION

HARD          SOFT

SHOCK DIRECTION

SHOCK DIRECTION

HOLDER OF MAGNETIC STORAGE APPARATUS, MAGNETIC STORAGE APPARATUS AND ELECTRIC DEVICE INCLUDING THE SAME

TECHNICAL FIELD

The present invention relates to a holder of a magnetic storage apparatus for holding the magnetic storage apparatus to a housing, and a magnetic storage apparatus and an electronic device including the same.

BACKGROUND ART

In a notebook personal computer, music terminal, and information terminal, while miniaturization and thinning advances, multi-functionalization progresses at the same time owing to improvement in operation throughput or the like, and data volume to process is also increasing. In such apparatus, in addition to internal memories, such as a semiconductor memory, it is desired to mount a relatively cheap and large-capacity hard disk storage apparatus.

However, a magnetic storage apparatus like a hard disk apparatus is vulnerable to external force structurally such as a fall, vibration, or shock. In consideration of protecting the magnetic storage apparatus from mechanical factors, such as vibration and shock, it is necessary to roughly divide the state between operation time and non-operation time of the magnetic storage apparatus before consideration. The magnetic storage apparatus here generally has the swing arm head structure driven by a voice coil motor (VCM). Since this structure is suitable for moving a head at high speed, it is possible to respond to higher speed and larger capacity. The operation time indicates the state in which the head is positioned over a disc, and performing the tasks such as writing to or reading from the magnetic disk. The non-operation time indicates that at other time than the operation time, the head is evacuated from the disk and the rotation of the disk is stopped in some cases.

At the operation time, the head is over the magnetic disk and slightly floats by air pressure, however when the head contacts the magnetic disk by vibration or shock, there is a possibility of giving a scratch. For this reason, if excessive acceleration is applied to the magnetic storage apparatus, the head may be at the position to evacuate from the magnetic disk.

At the non-operation time, the head is evacuated from the disk and the head will not directly scratch the disk. However the head is held only by a VCM magnet and induced electromotive force of the coil, thus if external force of a certain fixed value or more is applied, the head mores over the disk, and there is a possibility of scratching the disk.

In order to prevent the head from contacting the magnetic disk by a vibration or shock, there are many methods suggested to attach a shock absorbing material typified by a rubber material and gel material in a gap between the magnetic storage apparatus and the housing to hold the magnetic storage apparatus.

Patent documents 1 and 2 disclose to include an elastic shock absorbing body which absorbs shock energy by elastic deformation, and the plastic shock absorbing body which absorbs shock energy by plastic deformation, between a disk drive and a case in order to protect the built-in device from shock. A shock less than or equal to a certain acceptable value is absorbed by deformation of the elastic shock absorbing body, and a shock more than or equal to the certain acceptable value is absorbed by deformation of the plastic shock absorbing body.

Patent documents 3 and 4 disclose to supply a plurality of anti-vibration rubber between a mounting frame of the head disk assembly, have a different strength for at least one of the anti-vibration rubber from the other anti-vibration rubber, so as to stabilize the hold state of the head disk assembly.

[Patent Document 1]
Japanese Unexamined Patent Application Publication No. 2002-358140
[Patent Document 2]
Japanese Unexamined Patent Application Publication No. 2003-242764
[Patent Document 3]
Japanese Unexamined Patent Application Publication No. 03-104079
[Patent Document 4]
Japanese Unexamined Patent Application Publication No. 01-46284

DISCLOSURE OF INVENTION

Technical Problem

When the magnetic storage apparatus receives a shock or vibration from a side surface direction, there is a possibility that the head evacuated from the disk moves over the disk in a plane direction by the shock or vibration, and contact the disk. However, the apparatuses disclosed in the patent documents 1 to 4 have no consideration over the configuration to avoid the movement of the head in the plane direction by the shock or vibration received from the side surface of the magnetic storage apparatus.

The present invention is made in view of such problem, and aims to provide a holder of the magnetic storage apparatus that is capable of efficiently absorbing the shock by converting the vibration and shock of the magnetic storage apparatus to rotational movement of the magnetic storage apparatus in the plane direction.

Technical Solution

According to one aspect of a holder of a magnetic apparatus of the present invention, a plurality of holding members are included that hold at least two corner parts of the magnetic storage apparatus, in which for the holding members, a sum total of holding power to hold one of opposite angles of the magnetic storage apparatus is different from a sum total of holding power to hold another of opposite angles.

Advantageous Effects

According to one aspect of the magnetic storage apparatus of the present invention, by configuring in a way to differentiate a total sum of holding power to hold one of the opposite angles of the magnetic storage apparatus from a total sum of holding power to hold the other of opposite angles, it is possible to have different amount of deformation per unit volume for each of the holding members when a shock is applied to the magnetic storage apparatus, thereby facilitating energy by the shock to be converted to rotation of the magnetic storage apparatus.

EXPLANATION OF REFERENCE

100 DISPLAY UNIT
110 LIQUID CRYSTAL
120 FRAME
130 BACK COVER
200 INPUT UNIT
210 HOUSING
211 RIB
212 HINGE
220 KEYBOARD
230 CONTACT PAD
240 REAR COVER
250 BATTERY COVER
260 MAGNETIC STORAGE APPARATUS COVER
270 MOUNTING SUBSTRATE
280 BATTERY
300 MAGNETIC STORAGE APPARATUS UNIT
310 UPPER CASE
320 MAGNETIC STORAGE APPARATUS
321 DISTRIBUTION CABLE
324 STOPPER
325 HEAD
330 LOWER CASE
331 CONNECTOR
340 TO 343 FIRST SHOCK ABSORBING MATERIAL FOAM RUBBER
340A TO 340D SHOCK ABSORBING MATERIAL FOAM RUBBER
340a HOLE
350 TO 355 SECOND SHOCK ABSORBING MATERIAL FOAM RUBBER
360 BLADE SPRING
361 THIRD SHOCK ABSORBING MATERIAL FOAM RUBBER
361a HOLE

BEST MODE FOR CARRYING OUT THE INVENTION

Hereinafter, embodiments of the present invention are described with reference to the attached drawings.

[First Embodiment]

Figure 1:
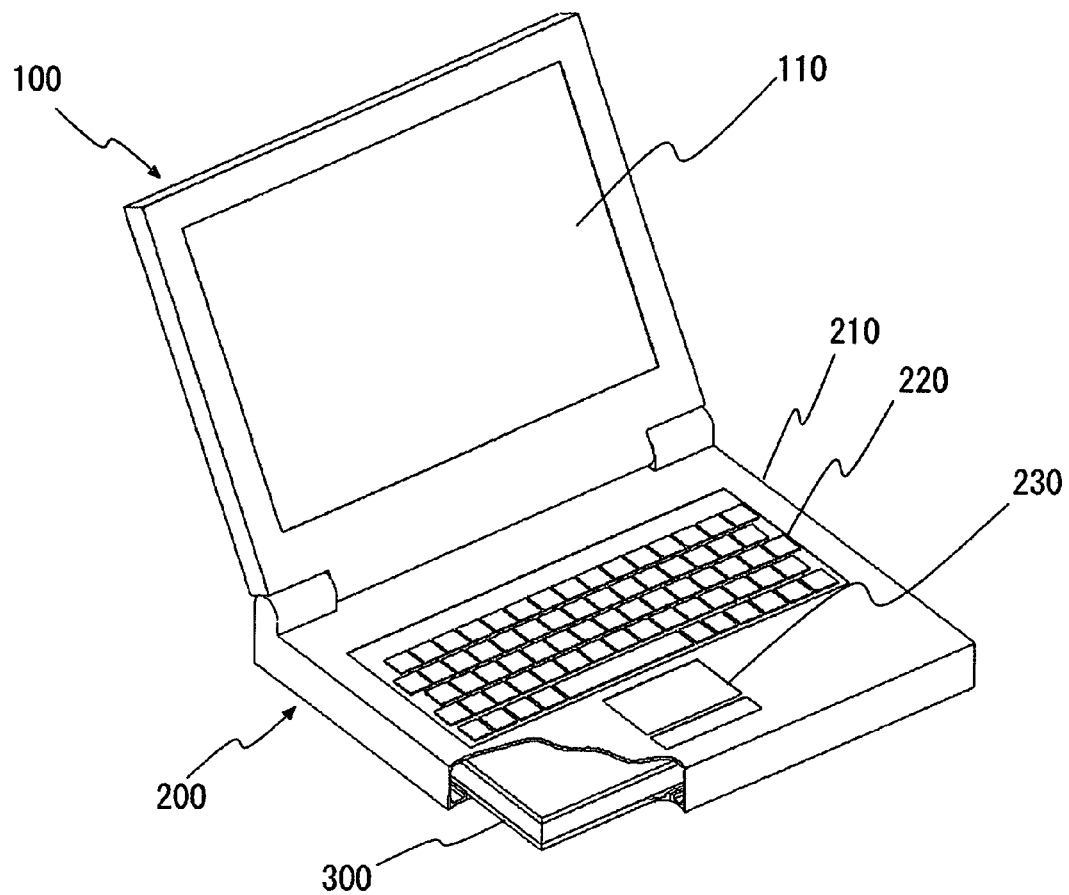
FIG. 1 is a perspective view illustrating a notebook personal computer including a holder of a magnetic storage apparatus according to the present invention in a first embodiment of the present invention.
Figure 2:
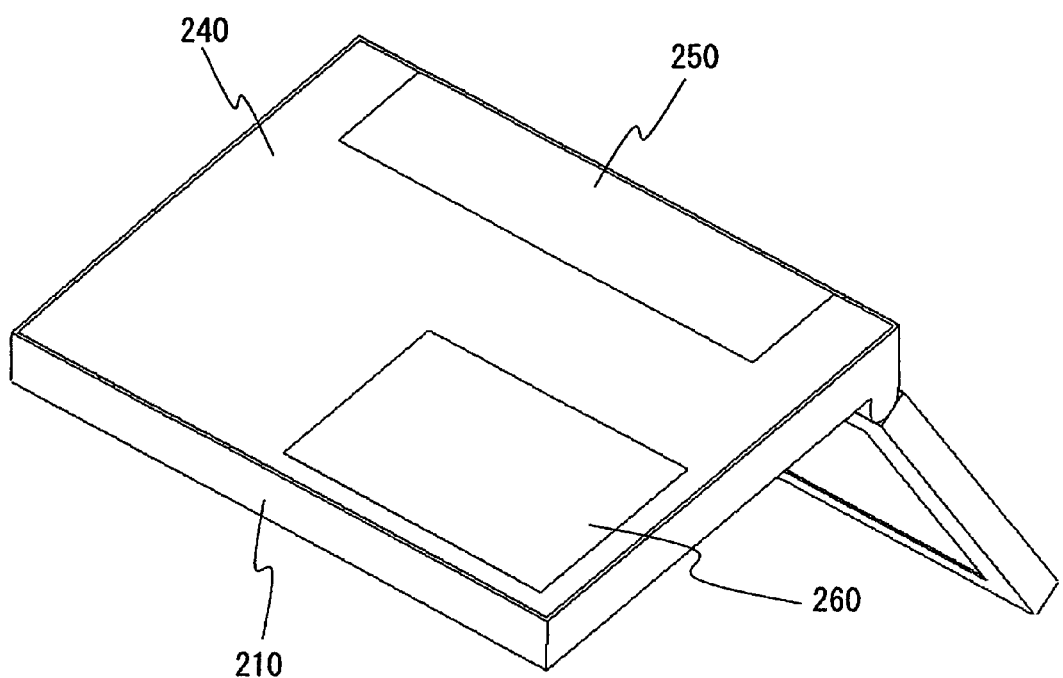
FIG. 2 is a perspective view of the notebook personal computer of FIG. 1 viewed from the bottom surface.

FIG. 1 is a perspective view illustrating a notebook personal computer including a holder of a magnetic storage apparatus according to the present invention in the first embodiment of the present invention. A notebook personal computer includes a display unit 100 and an input unit 200. A magnetic storage apparatus unit 300 is built in the input unit 200. The input unit 200 includes a housing 210, a keyboard 220, and a contact pad 230. The liquid crystal unit 110 includes liquid crystals 110. FIG. 2 is a perspective view of the notebook personal computer of FIG. 1 viewed from the bottom surface. A rear cover 240, battery cover 250, and magnetic storage apparatus cover 260 are disposed to the housing 210. Each cover is connected to the housing 210 by a screw or the like which is not illustrated. Note that the electronic device to which the holder is mounted according to the present invention is not limited to a notebook personal computer, but may be an electronic, device such as a music terminal or information terminal.

Figure 3:
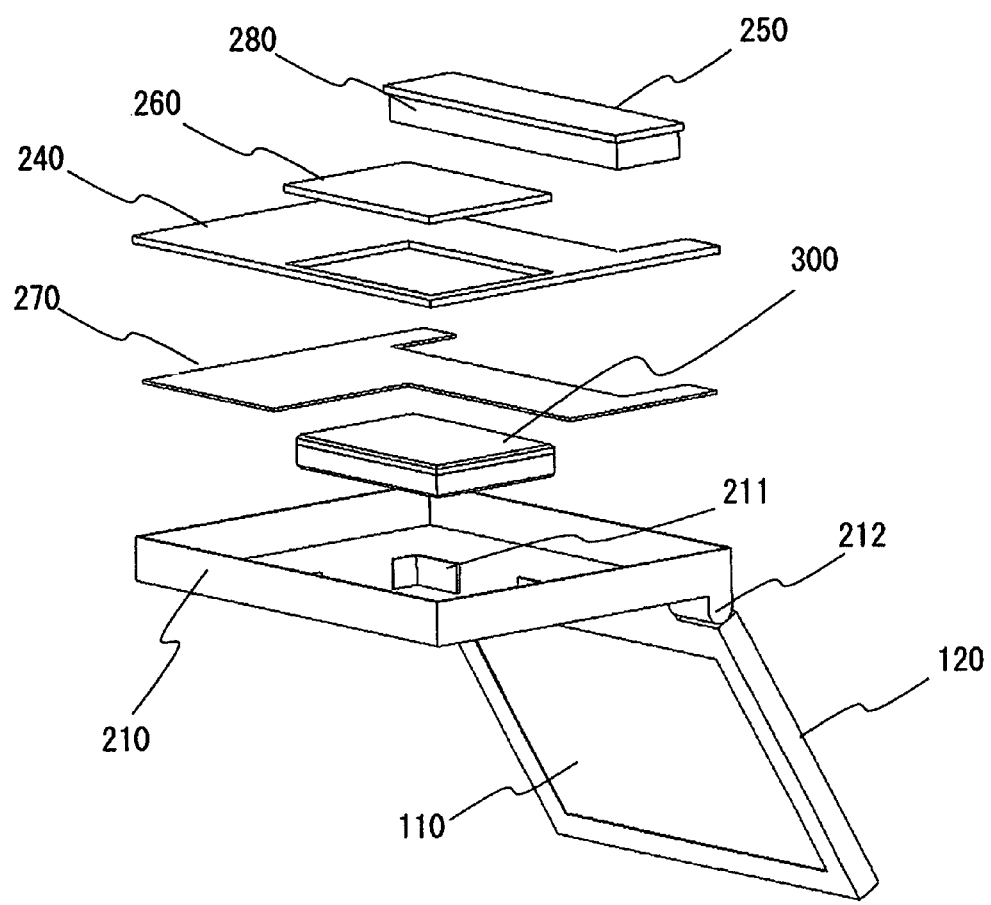
FIG. 3 is a perspective view of the notebook personal computer according to the present invention viewed from the bottom surface, and is an exploded view of FIG. 2.
Figure 4:
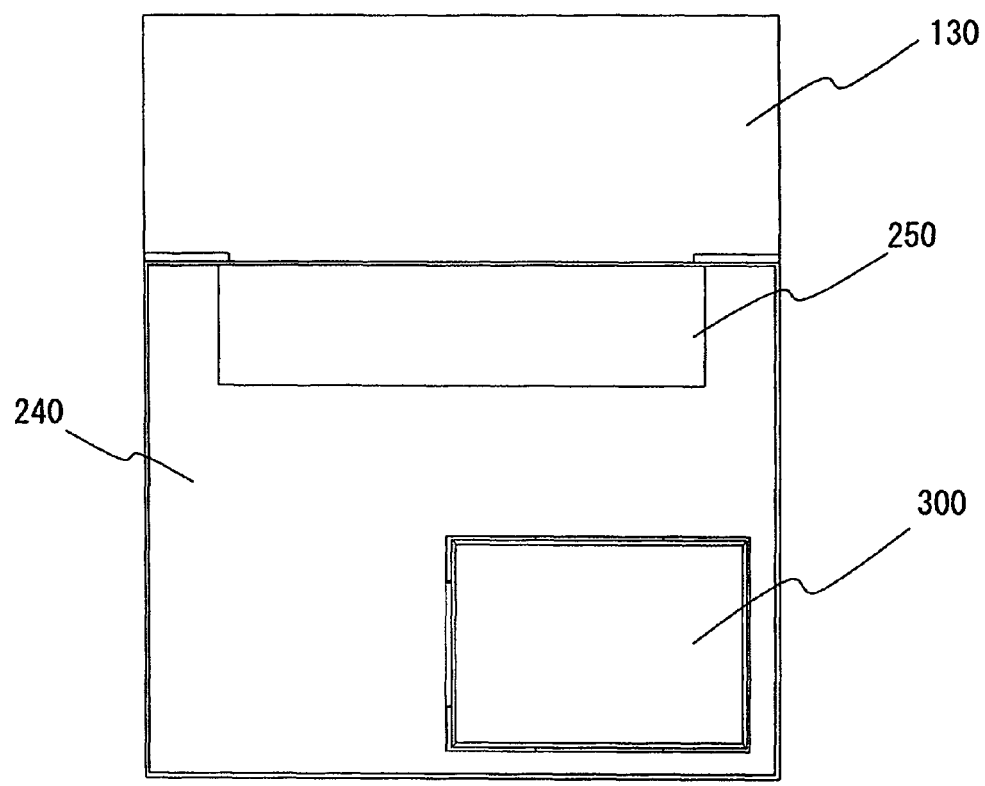
FIG. 4 is a bottom view when removing a magnetic storage apparatus cover 260 of FIG. 2.

FIG. 3 is the perspective view of the notebook personal computer according to the present invention viewed from the bottom surface, and is an exploded view of FIG. 2. FIG. 4 is a bottom view when removing the magnetic storage apparatus cover 260 of FIG. 2. As illustrated in FIG. 3, in the housing 210, a mounting substrate 270, a battery 280, and a magnetic storage apparatus unit 300 are included. A rib 211, a fixing member for fixing the magnetic storage apparatus, is formed to the housing 210. The housing 210 is connected to the display unit 100 with a hinge 212 interposed therebetween. The display unit 100 has the liquid crystals 110, a frame 120, and a back cover 130 (FIG. 4). FIG. 3 illustrates the state in which the magnetic storage apparatus cover 260 is removed and the magnetic storage apparatus unit 300 is exposed. The magnetic storage apparatus unit 300 is configured to be replaceable as a removable unit.

Figure 5:
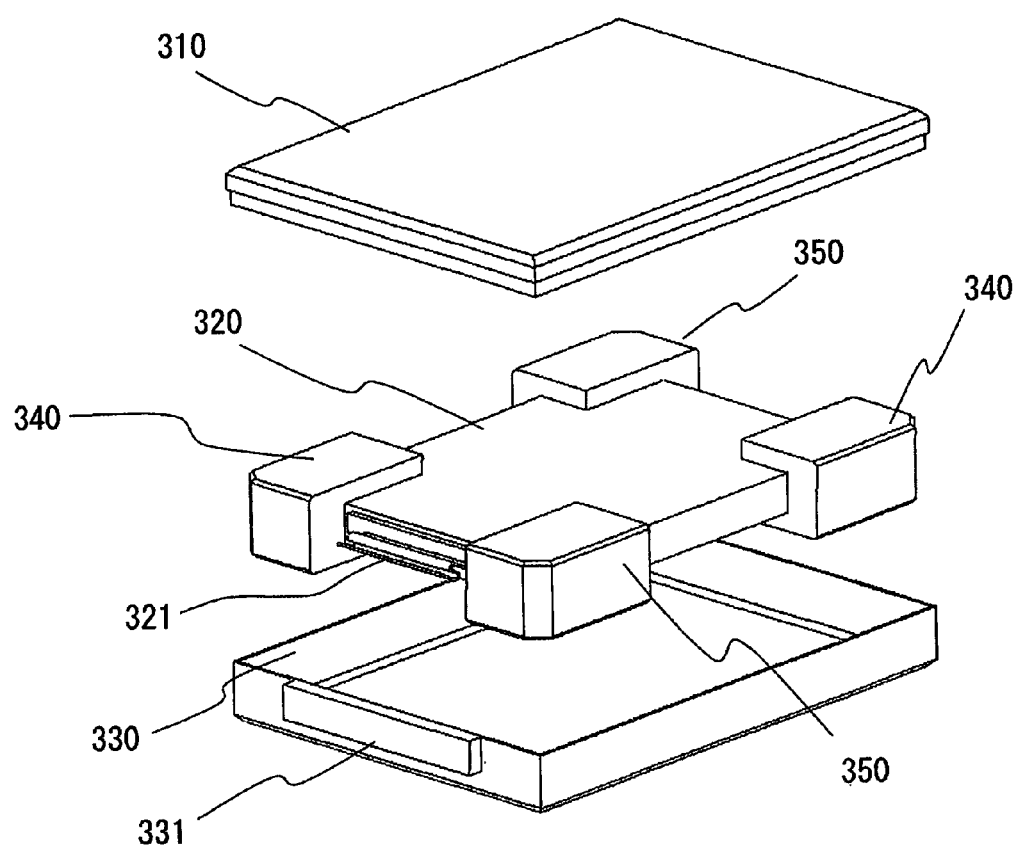
FIG. 5 is an exploded view of a magnetic storage apparatus unit 300.

FIG. 5 is an exploded view of the magnetic storage apparatus unit 300. To the magnetic storage apparatus unit 320, a magnetic storage apparatus 320 is mounted between an upper case 310 and a lower case 330 with a first shock absorbing material foam rubber 340 and a second shock absorbing material foam rubber 350 interposed therebetween. The first shock absorbing material foam rubber 340 and the second shock absorbing material foam rubber 350 are disposed on four corners (corner parts) of the magnetic storage apparatus 320. The upper case 310 and lower case 330 need to be rigid bodies themselves, and are desirably an aluminum case or thin plate stainless case. If the upper case 310 and lower case 330 are resin cases, it is necessary to have the structure in which they are firmly fixed by the rib 211 (FIG. 3) mounted in the housing 210 so as not to be deformed. A distribution cable 321 of the magnetic storage apparatus 320 is connected to a connector 331 of the lower case 330, and to a connector over the mounting substrate 270 (FIG. 3) mounted to the housing 210.

Figure 6:
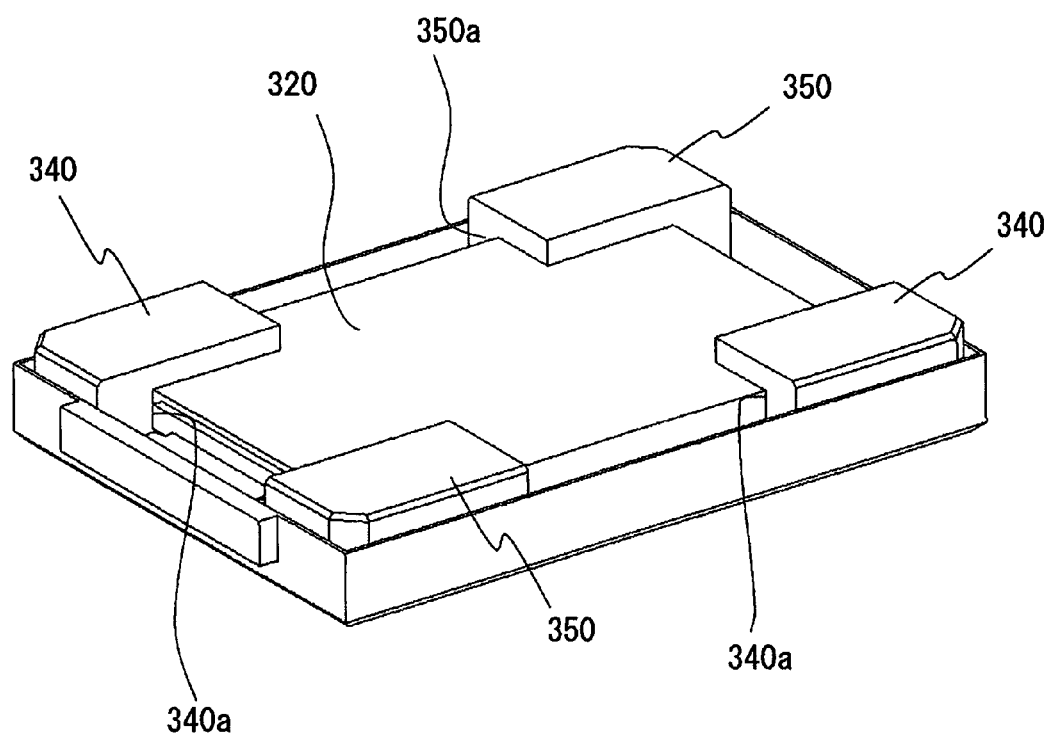
FIG. 6 is a perspective view of the magnetic storage apparatus unit 300 in the state where an upper case 310 is removed.
Figure 7:
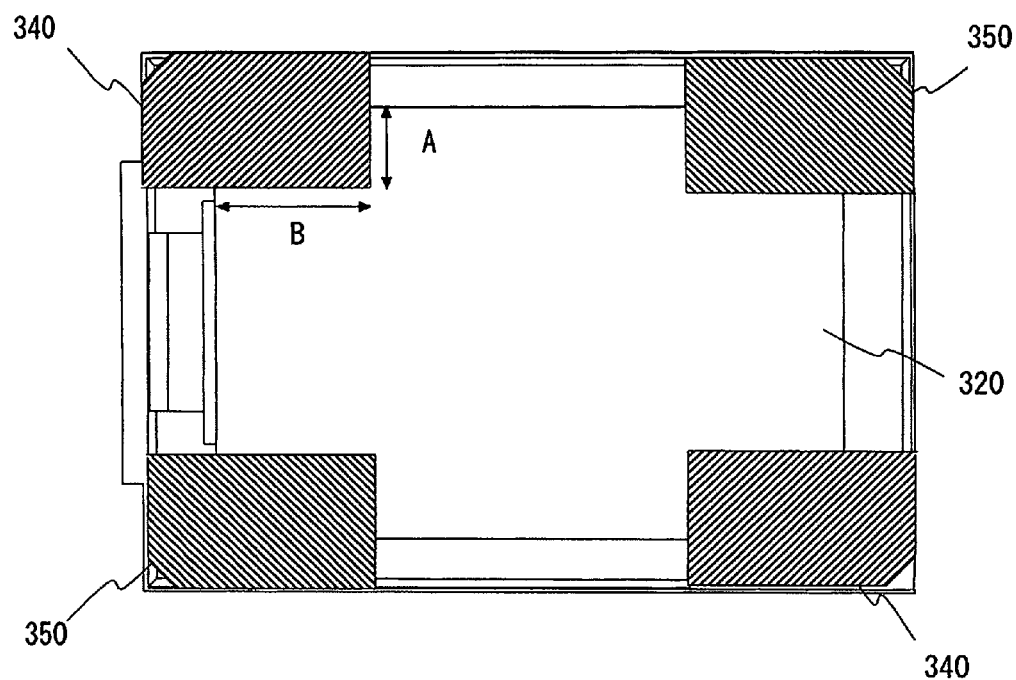
FIG. 7 is a plan view of the magnetic storage apparatus unit 300 in the state where the upper case 310 is removed.

FIG. 6 is a perspective view of the magnetic storage apparatus unit 300 in the state where the upper case 310 is removed. FIG. 7 is a plan view of the magnetic storage apparatus unit 300 in the state where the upper case 310 is removed. The holder of the magnetic storage apparatus according to the present invention includes a plurality of holding members (for example, the first shock absorbing material foam rubber 340 and the second shock absorbing material foam rubber 350) for holding the corner parts of the magnetic storage apparatus. The holding members are configured in a way that a sum total of holding power for holding one of opposite angles is different from a sum total of holding power for holding the other of the opposite angles. In the first embodiment, all the holding members disposed on the four corners have the same shape.

The first shock absorbing material foam rubber 340 is disposed on the upper left and lower right of the magnetic storage apparatus 320, and is disposed on one diagonal (FIG. 7). Further, the second shock absorbing material foam rubber 350 is disposed on the upper right and lower left of the magnetic storage apparatus 320, and is disposed on the other diagonal of the magnetic storage apparatus 320. The first shock absorbing material foam rubber 340 and the second shock absorbing material foam rubber 350 can be a viscoelastic rubber, silicone elastomer, and gel material, for example.

As for the holding members, the members holding the opposite angles to be paired up are formed to have the same hardness. Specifically, the hardness of the first shock absorbing material foam rubber 340 which holds the upper left and lower right of the magnetic storage apparatus 320 is equal. Moreover, the hardness of the second shock absorbing material foam rubber 350 holding the upper right and lower left of the magnetic storage apparatus 320 is equal. In this embodiment, in order to fully absorb the shock, it is preferable that a hardness difference between the first shock absorbing material foam rubber 340 and the second shock absorbing material foam rubber 350 is about 1.5 times to twice. Note that in the explanation, it is considered that the first shock absorbing material foam rubber 340 has greater hardness than the second shock absorbing material foam rubber 350.

As illustrated in FIG. 6, the first shock absorbing material foam rubber 340 and the second shock absorbing material foam rubber 350 are formed to have greater thickness than the magnetic storage apparatus 320 to hold. As for the first shock absorbing material foam rubber 340 and the second shock absorbing material foam rubber 350, at the center of the thickness direction, holes 340a and 350a are formed which are hollowed along the periphery of the magnetic storage apparatus 320. The corner parts of the four corners of the magnetic storage apparatus 320 are inserted in the holes 340a and 350a, so that the upper surface, bottom surface, and side surface of the corner parts are held. The first shock absorbing material foam rubber 340 is configured to hold the corner part of the magnetic storage apparatus 320 in L shape.

As illustrated in FIG. 7, inside the holes 340a and 350a, the first shock absorbing material foam rubber 340 and the second shock absorbing material foam rubber 350 contact sides in a short side direction of the magnetic storage apparatus 320 and sides in a long side direction that is adjacent to the sides in the short side direction. The first shock absorbing material foam rubber 340 and the second shock absorbing material foam rubber 350 are configured to have different contact areas between the sides in the short side direction and the sides in the long side direction of the magnetic storage apparatus 320. Specifically, the first shock absorbing material foam rubber 340 and the second shock absorbing material foam rubber 350 contact along the side surface in the short side direction and a length A of the magnetic storage apparatus 320, and along the side surface in the long side direction and a length B of the magnetic storage apparatus 320. Note that the length A is shorter than the length B.

As described above, by differentiating the contact area with the side surface in the long side direction and the contact area with the side surface in the short side direction, it is possible to have different amount of deformation per unit volume between the first shock absorbing material foam rubber 340 and the second shock absorbing material foam rubber 350 when external force is applied to the magnetic storage apparatus 320. In other words, deformation of the holding member on the side with a smaller contact area becomes larger compared with the side with a larger contact area. Then, the magnetic storage apparatus 320 moves to project toward the holding member that contacts the side with the smaller contact area. Consequently, the energy by absorbing shock is converted to rotation of the magnetic storage apparatus 320.

Figure 8A:
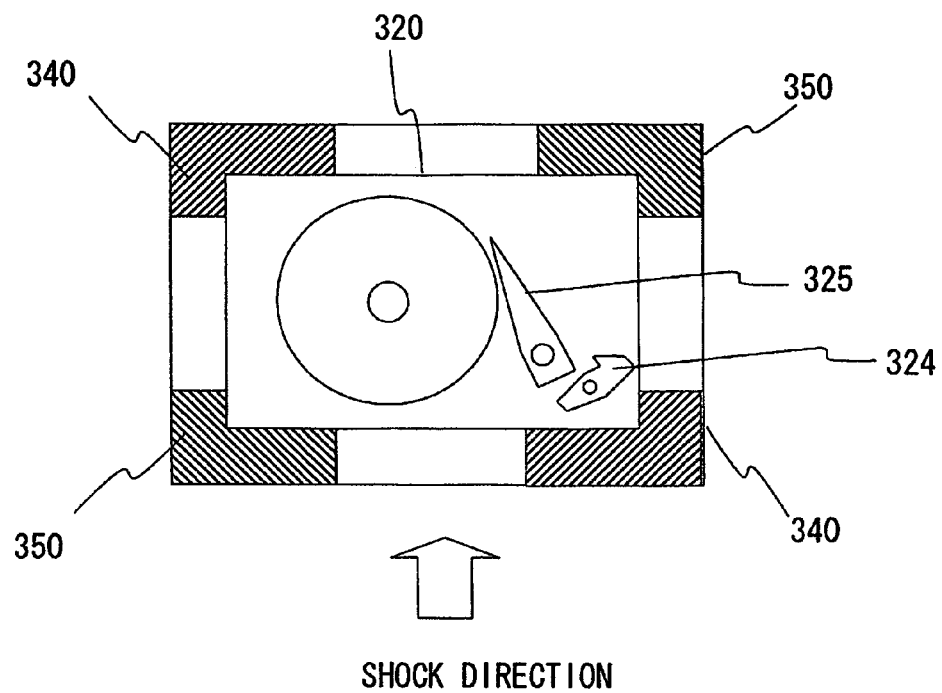
FIG. 8A illustrates an operation of the holder of the magnetic storage apparatus according to the first embodiment.
Figure 8B:
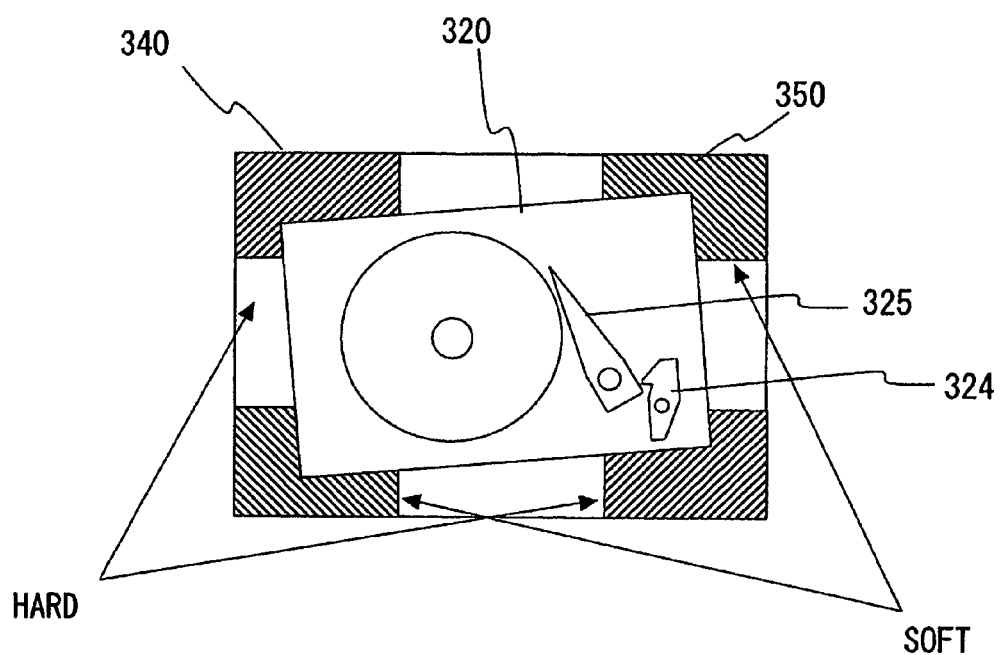
FIG. 8B illustrates an operation of the holder of the magnetic storage apparatus according to the first embodiment.

FIGS. 8A and 8B illustrate operations of the holder of the magnetic storage apparatus according to the first embodiment. FIGS. 8A and 8B illustrate the situation in which a shock is applied in parallel to the magnetic storage apparatus. As illustrated in FIG. 8A, when a shock is applied from the bottom of the drawing in parallel to magnetic storage apparatus 320, stress is applied to the upper left first shock absorbing material foam rubber 340 and the upper right second shock absorbing material foam rubber 350 that hold the side applied with the shock and the side on the opposite side. At this time, since the hardness of the first shock absorbing material foam rubber 340 is greater than that of the second shock absorbing material foam rubber 350, as illustrated in FIG. 8B, the upper right corner part of the magnetic storage apparatus 320 moves to be pushed against the holding member more than the upper left corner part.

In other words, as for the holder, by the shock applied from the bottom of the drawing to the magnetic storage apparatus 320, the second shock absorbing material foam rubber 350 with less hardness is deformed larger than the first shock absorbing material foam rubber 340 with greater hardness. As a result, the corner parts of the magnetic storage apparatus 320 receive different reactive force from left and right holders, and then the magnetic storage apparatus 320 moves while rotating counterclockwise, as illustrated in FIG. 8B. Note that although FIGS. 8A and 8B explained the case where a shock is applied from the bottom of the drawing, also in the case when a shock is applied in parallel to the magnetic storage apparatus from other directions, by the first shock absorbing material foam rubber 340 and the second shock absorbing material foam rubber 350 deforming with different amount of deformation, it is possible to convert the shock received from outside to rotation of the magnetic storage apparatus 320.

Further, by the magnetic storage apparatus 320 rotating counterclockwise, a stopper 324 included in the magnetic storage apparatus 320 rocks counterclockwise by a moment load, thereby effectively operating the stopper 324.

Figure 9A:
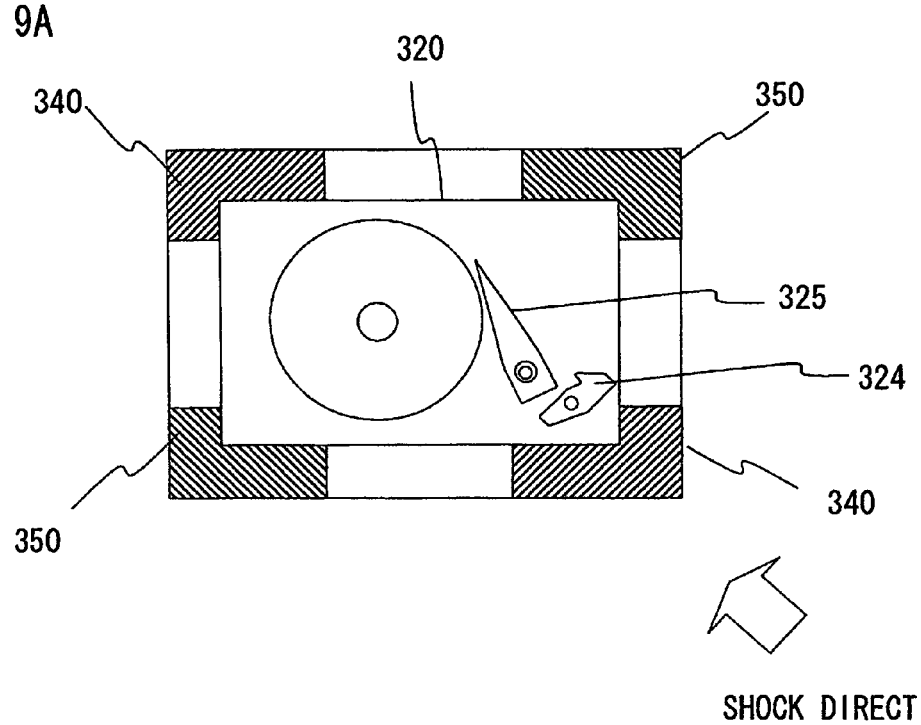
FIG. 9A illustrates an operation of the holder of the magnetic storage apparatus according to the first embodiment.
Figure 9B:
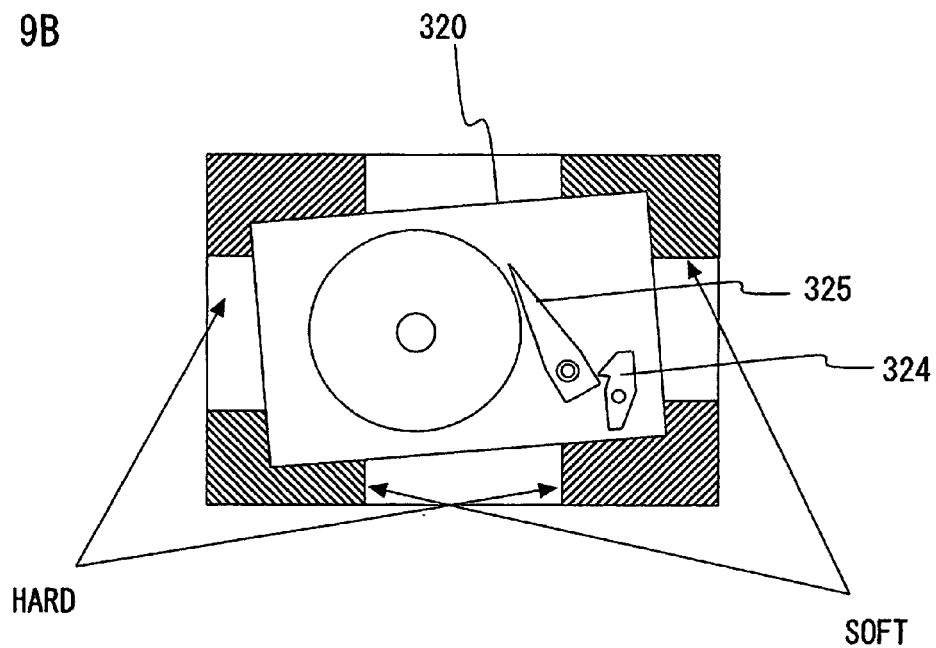
FIG. 9B illustrates an operation of the holder of the magnetic storage apparatus according to the first embodiment.

FIGS. 9A and 9B illustrate operations of the holder of the magnetic storage apparatus according to the first embodiment. FIGS. 9A and 9B illustrate the situation at the time the magnetic storage apparatus 320 receives a shock from an oblique direction. As illustrated in FIG. 9A, when a shock is applied from diagonally downward right of the drawing to the magnetic storage apparatus 320, a load is applied to the first shock absorbing material foam rubber 340 that holds upper left. However, the first shock absorbing material foam rubber 340 has greater hardness and smaller amount of deformation than the second shock absorbing material foam rubber 350, while the second shock absorbing material foam rubber 350 is configured to be easily deformed. Therefore, the load applied to the first shock absorbing material foam rubber 340 spreads to the second shock absorbing material foam rubber 350. Since the first shock absorbing material foam rubber 340 and the second shock absorbing material foam rubber 350 contact with the sides in the short side direction and the sides in the long side direction of the magnetic storage apparatus 320 with different contact area, the magnetic storage apparatus 320 rotates counterclockwise as illustrated in FIG. 9B.

As described above, for the holder of the magnetic storage apparatus 320 according to the first embodiment, by configuring in a way that the sum total of holding power to hold one of the opposite angles is different from the sum total of holding power to hold the other opposite angles, the shock load can be converted to the movement in the rotation direction of the entire magnetic storage apparatus. Then the entire magnetic storage apparatus 320 rotates counterclockwise, and the stopper 324 included in the magnetic storage apparatus 320 moves toward the head 325 side. This enables the stopper 324 to effectively operate. Further, by holding with shock absorbing materials with different hardness, it is possible to take two or more kinds of vibration frequency bands to absorb the shock. For example, it is possible to absorb the vibration from 200 Hz to 1 kHz by the second shock absorbing material foam rubber 350 with low hardness, and absorb the vibration from 30 to 200 Hz by the first shock absorbing material foam rubber 340 with high hardness.

[Second Embodiment]

Figure 10:
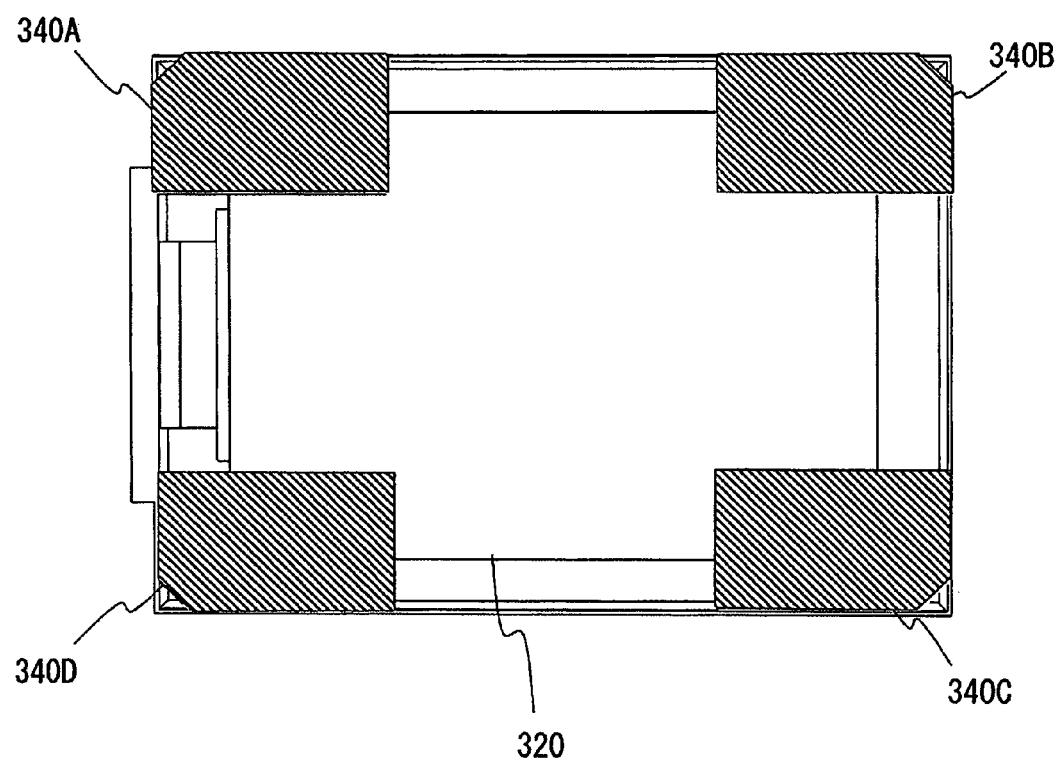
FIG. 10 is a plan view illustrating the configuration of a holder of a magnetic storage apparatus 320 according to a second embodiment of the present invention.

FIG. 10 is a plan view illustrating the configuration of the holder of the magnetic storage apparatus 320 according to the second embodiment of the present invention. In the first embodiment, the holding members that hold the opposite angles to be paired up is composed of the same shock absorbing material foam rubber, however in the second embodiment, all the holding members holding the four corners are configured to have different hardness. As for the corner parts of the four corners of the magnetic storage apparatus 320, a shock absorbing material foam rubber 340A is disposed on the upper left, a shock absorbing material foam rubber 340B is disposed on the upper right, a shock absorbing material foam rubber 340C is disposed on the lower right, and a shock absorbing material foam rubber 340D is disposed on the lower left. Here, the hardness of each holder is configured to gradually increase in the clockwise order from the upper left, as in 340A, 340B, 340C, and 340D. In this way, by configuring the holders holding the corner parts of the four corners each with different hardness, it is possible to further finely specify the vibration frequency bands that can be absorbed. Note that the hardness of the holders that hold the four corners are not necessarily changed clockwise, but the holders with any different hardness may be disposed on the four corners.

[Third Embodiment]

Figure 11:
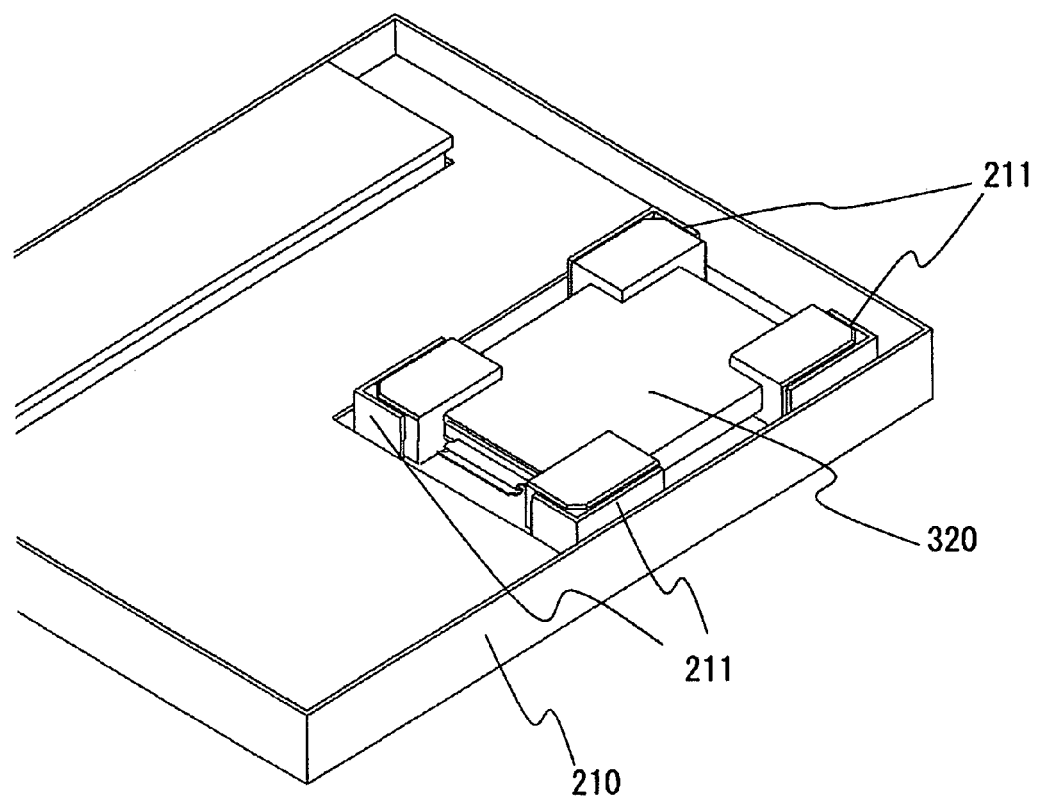
FIG. 11 is a perspective view illustrating a configuration example of a holder of a magnetic storage apparatus according to a third embodiment of the present invention.

FIG. 11 is a perspective view illustrating a configuration example of a holder of the magnetic storage apparatus according to the third embodiment of the present invention. In the first embodiment, the magnetic storage apparatus 320 is accommodated inside the upper case 310 and the lower case 330. However in the third embodiment, the magnetic storage apparatus 320 is fixed to the rib 211 that is formed to the magnetic storage apparatus 320 with the first shock absorbing material foam rubber 340 and the second shock absorbing material foam rubber 350 interposed therebetween. The first shock absorbing material foam rubber 340 and the second shock absorbing material foam rubber 350 are fixed and connected to the rib 211 by an adhesive agent. By omitting the upper case 310 and the lower case 330 in this way, it is possible to attempt to reduce the number of assembly parts and also achieve miniaturization more than the first embodiment.

[Fourth Embodiment]

Figure 12:
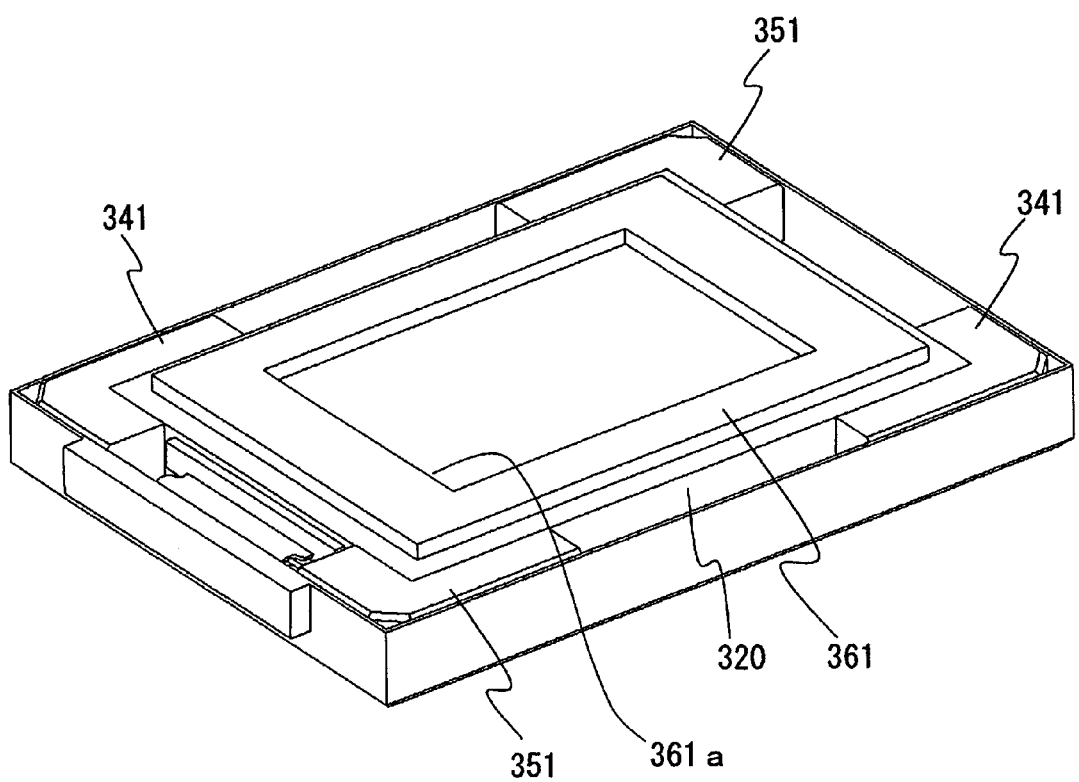
FIG. 12 is a perspective view illustrating a configuration example of a holder of a magnetic storage apparatus according to a fourth embodiment of the present invention.

FIG. 12 is a perspective view illustrating a configuration example of a holder of the magnetic storage apparatus according to the fourth embodiment of the present invention. In the first to third embodiments, the holders disposed to the corner parts of the four corners are formed to be thicker than the thickness of the magnetic storage apparatus 320. However in the fourth embodiment, the holding members are formed in L-shape, and have the same thickness as the magnetic storage apparatus 320. As illustrated in FIG. 12, L-shaped shock absorbing material foam rubber is disposed along the periphery of the corner parts of the four corners of the magnetic storage apparatus 320. The first shock absorbing material foam rubber 341 of the same hardness is disposed on the upper left and lower right of the drawing. Further, the second shock absorbing material foam rubber 351 of the same hardness is disposed on the upper right and lower left of the drawing. Note that the hardness of the first shock absorbing material foam rubber 341 is greater than the second shock absorbing material foam rubber 351.

The first shock absorbing material foam rubber 341 and the second shock absorbing material foam rubber 351 are formed in the almost same thickness as the magnetic storage apparatus 320 to hold. Therefore, in order to protect the upper surface and bottom surface not illustrated of the magnetic storage apparatus 320, quadrangular third shock absorbing material foam rubber 361 is disposed to the upper surface and bottom surface of the magnetic storage apparatus 320. A hole 361a is formed to the center of the third shock absorbing material foam rubber 361, which is configured to be easily deformed in the parallel direction. By forming the thickness of the first shock absorbing material foam rubber 341 and the second shock absorbing material foam rubber 351 to be about the same as the thickness of the magnetic storage apparatus 320, it is possible to attempt to reduce the space in the thickness direction.

[Fifth Embodiment]

Figure 13:
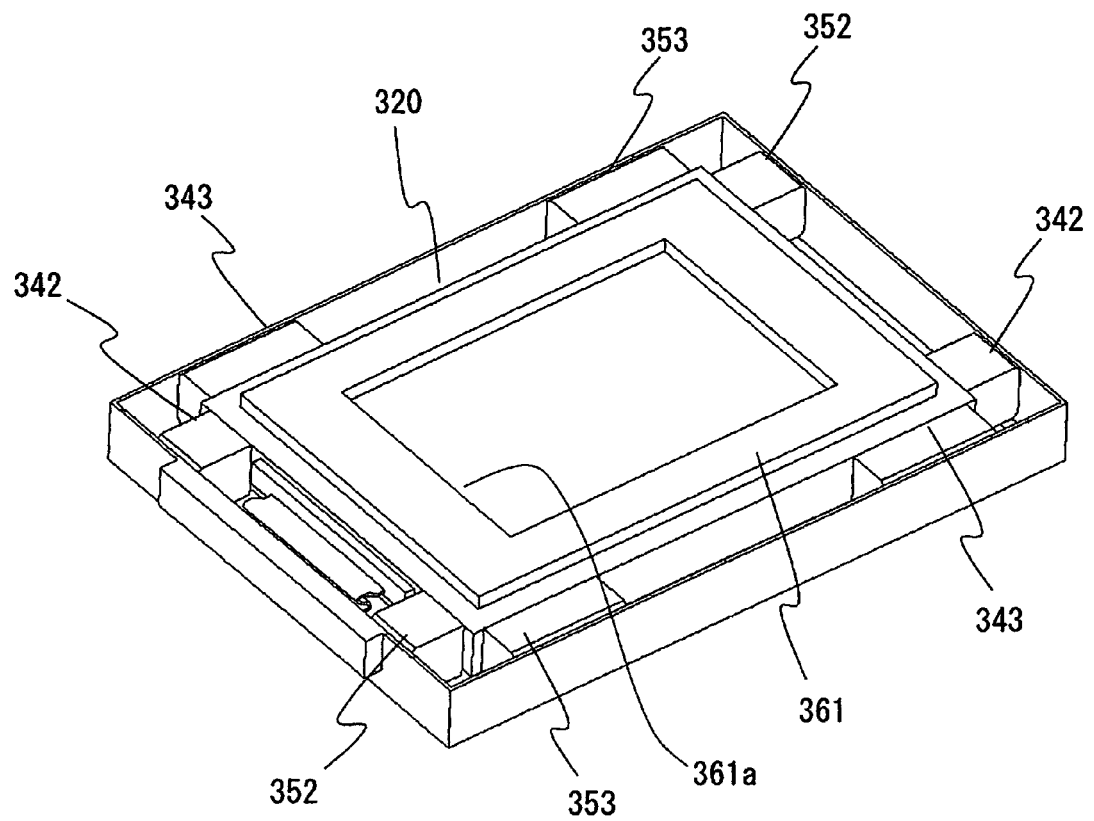
FIG. 13 is a perspective view illustrating a configuration example of a holder of a magnetic storage apparatus according to a fifth embodiment of the present invention.
Figure 14:
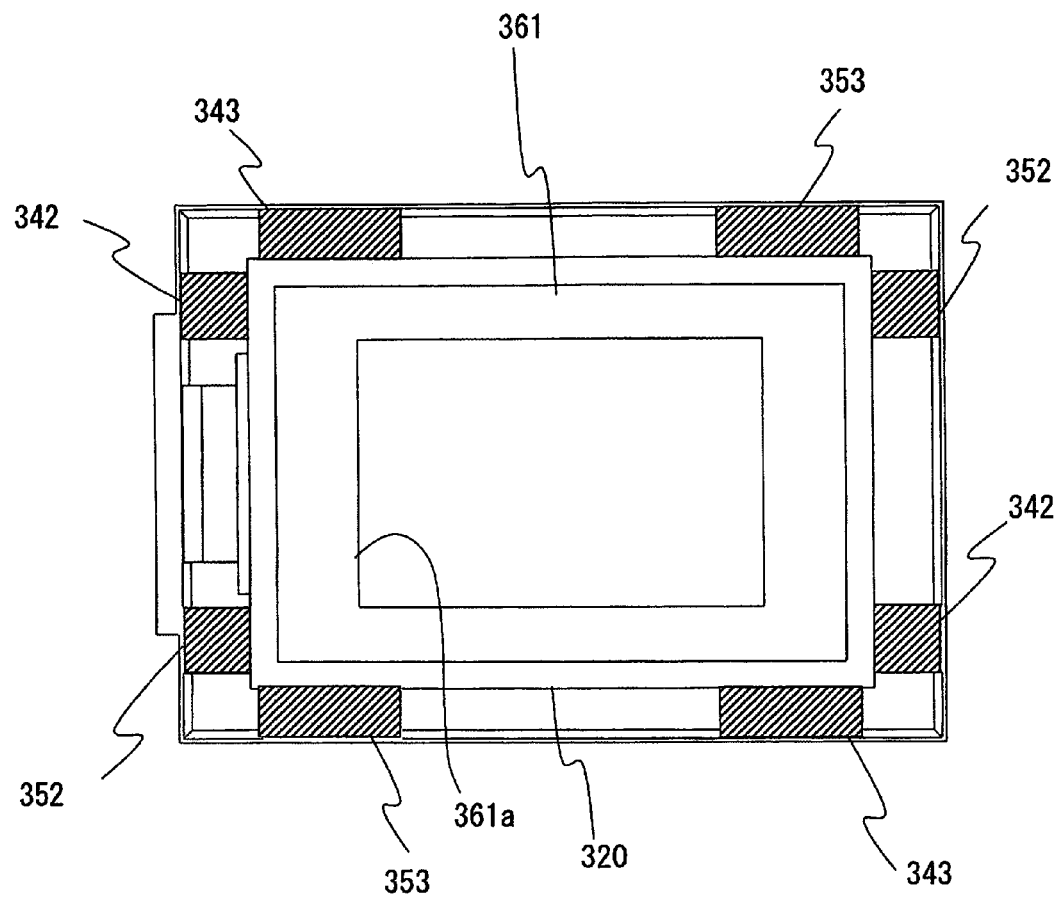
FIG. 14 is a plan view of FIG. 13.

FIG. 13 is a perspective view illustrating a configuration example of a holder of the magnetic storage apparatus according to the fifth embodiment of the present invention. FIG. 14 is a plan view of FIG. 13. Although the L-shaped holding member is disposed as one member in the fourth embodiment, in the fifth embodiment, each of the first shock absorbing material foam rubber and the second shock absorbing material foam rubber are composed by two members. To be specific, the holding member on the upper left of the drawing is composed of two members, which are the first shock absorbing material foam rubber 342 that contact the side in the short side direction of the magnetic storage apparatus 320 and the first shock absorbing material foam rubber 343 that contacts the side in the long side direction. A predetermined gap is interposed between the first shock absorbing material foam rubber 342 and 343. The holding member on the upper right of the drawing is composed of the second shock absorbing material foam rubber 352 that contacts the side in the short side direction of the magnetic storage apparatus 320 and the first shock absorbing material foam rubber 353 that contacts the side in the long side direction. The predetermined gap is interposed between the first shock absorbing material foam rubber 352 and 353. As long as the holders are disposed to the four corners of the magnetic storage apparatus 320, it is not necessary to exactly hold the corner parts.

Note that each of the other corner parts of the magnetic storage apparatus 320 is also held by a holding member composed of two members. The thickness of the first shock absorbing material foam rubber 342 and 343 and the second shock absorbing material foam rubber 352 and 353 is formed to the almost same thickness as the magnetic storage apparatus 320 to hold. Moreover, to the upper surface and bottom surface not illustrated of the magnetic storage apparatus 320, the quadrangular third shock absorbing material foam rubber 361 is disposed to the upper surface and bottom surface of the magnetic storage apparatus 320 in a similar manner as the fourth embodiment.

The holding member can be composed of a plurality of members in this way. It is needless to say that the holding member holding one corner can be composed of three or more members. By the predetermined gap interposed between the first shock absorbing material foam rubber 342 and 343, and between 352 and 353, it is possible to easily deform each of the shock absorbing material foam rubber in the gap parts, and sufficient deformation can be expected. This enables the energy by shock to be further effectively converted to rotation of the magnetic storage apparatus 320.

[Sixth Embodiment]

Figure 15:
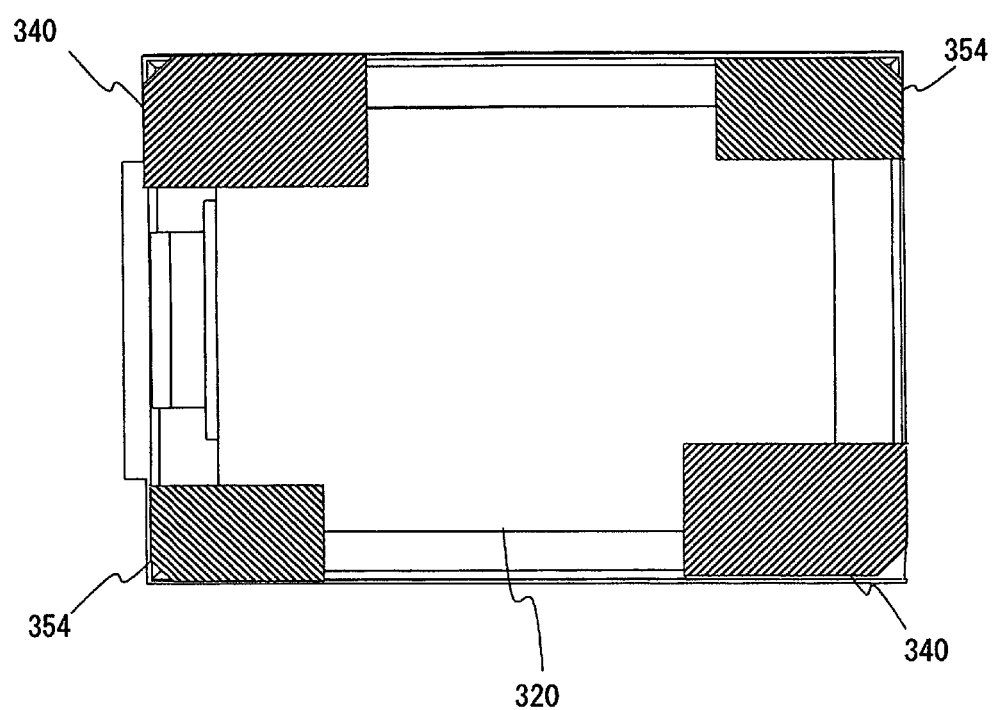
FIG. 15 is a plan view illustrating the configuration of a holder of a magnetic storage apparatus according to a sixth embodiment.

FIG. 15 is a plan view illustrating the configuration of a holder of the magnetic storage apparatus according the sixth embodiment. In the sixth embodiment, the first shock absorbing material foam rubber 340 disposed on one of the opposite angles and the second shock absorbing material foam rubber 354 disposed on the other opposite angles are configured to have different sizes. The first shock absorbing material foam rubber 340 is larger than the second shock absorbing material foam rubber 354. By having different sizes for the first shock absorbing material foam rubber 340 and the second shock absorbing material foam rubber 354, it is possible to differentiate the amount of deformation between the first shock absorbing material foam rubber 340 and the second shock absorbing material foam rubber 354 when external force is applied by a shock or the like. This enables the magnetic storage apparatus 320 to convert the energy by the shock to rotation in the direction of the magnetic storage apparatus 320. Note that the hardness of the first shock absorbing material foam rubber 340 and the second shock absorbing material foam rubber 354 may be the same or different.

As described above, according to the holder of the magnetic storage apparatus of this embodiment, even if the first shock absorbing material foam rubber 340 and the second shock absorbing material foam rubber 354 are the same material, by differentiating the sizes, it is possible to adjust the amount of deformation when a load is applied. Thus, the shock load applied to the magnetic storage apparatus 320 can be easily converted to rotation of the entire magnetic storage apparatus 320. In the sixth embodiment, it is not necessary to prepare the foam rubber with a plurality of kinds of hardness as the holding member as mentioned above.

Note that in this embodiment, if the first shock absorbing material foam rubber 340 and the second shock absorbing material foam rubber 354 are composed of the shock absorbing materials with different hardness, it is possible to take two or more kinds of vibration frequency bands to absorb the shock and also to expand the vibration frequency band in which vibration can be absorbed.

Additionally, in the above explanation, the holding members with two kinds of sizes are used, however it is possible to configure in a way that holding members each with different size are disposed to the four corners. Even if the holding members each with different size are disposed, the magnetic storage apparatus 320 moves toward the holding member with a small size when a shock is applied, thus the energy by the shock can be converted to rotation of the magnetic storage apparatus 320.

[Seventh Embodiment]

Figure 16A:
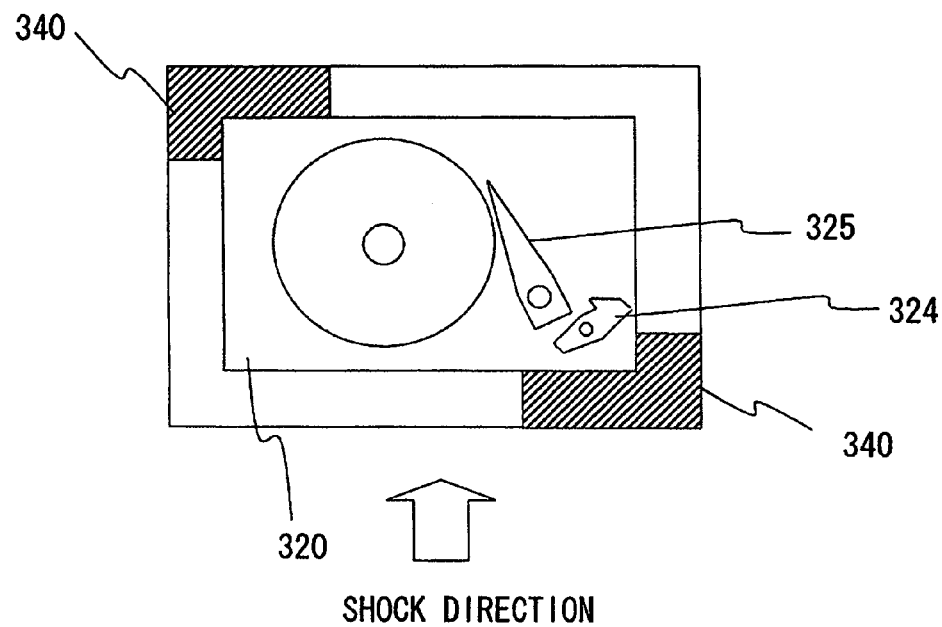
FIG. 16A is a plan view illustrating a configuration example of a holder of a magnetic storage apparatus according to a seventh embodiment.
Figure 16B:
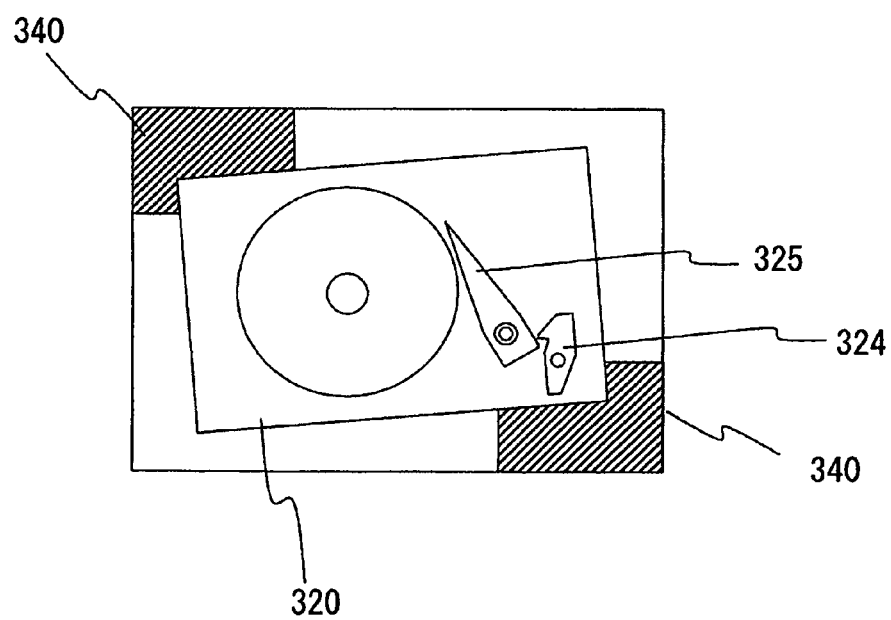
FIG. 16B is a plan view illustrating the configuration example of the holder of the magnetic storage apparatus according to the seventh embodiment.

FIGS. 16A and 16B are plan views illustrating a configuration example of a holder of the magnetic storage apparatus according to the seventh embodiment. In the seventh embodiment, the first shock absorbing material foam rubber 340 is disposed only on one of the opposite angles, and the holding member is not disposed on the other opposite angles. Even when configuring to dispose the holding members only to one of the opposite angles in this way, by differentiating the sum total of the holding power to hold one of opposite angles from the sum total of the holding power to hold the other opposite angles, it is possible to convert a load by shock applied to the magnetic storage apparatus to rotation of the magnetic storage apparatus. Note that as for the first shock absorbing material foam rubber 340 that holds one of the opposite angles, the shock absorbing material foam rubber having the shape as in the fourth and fifth embodiments can be used as well.

When a shock is applied from, for example, bottom of the drawing to the magnetic storage apparatus 320 as illustrated in FIG. 16A, the corner part of the upper left of the drawing is held by the first shock absorbing material foam rubber 340, whereas the corner part of the upper right of the drawing is not held by the holding member. Thus the unheld corner part of the upper right moves upward of the drawing. Then the whole magnetic storage apparatus 320 rotates counterclockwise. In the seventh embodiment as described so far, since the holding members that hold one of the opposite angles can be omitted, it is possible to reduce the number of assembly parts.

[Eighth Embodiment]

Figure 17A:
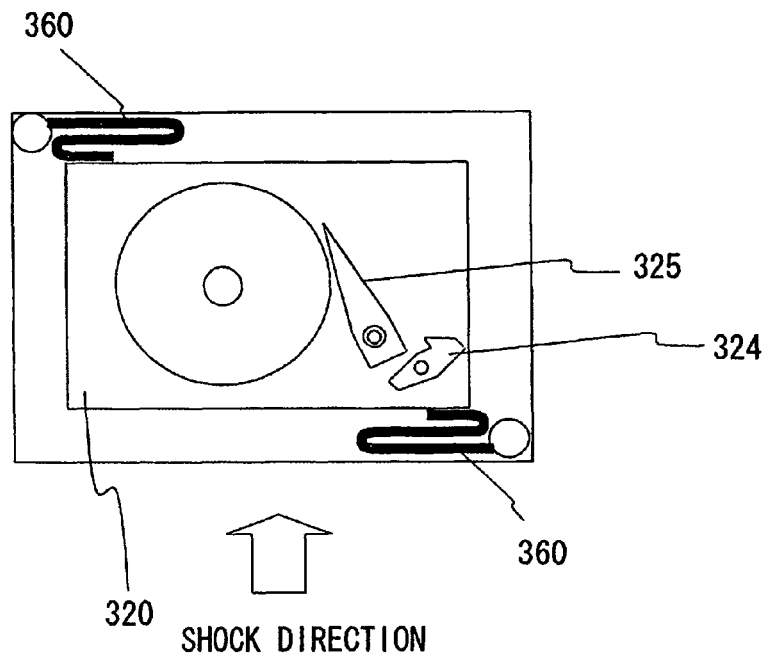
FIG. 17A is a plan view illustrating a configuration example of a holder of a magnetic storage apparatus according to a eighth embodiment.
Figure 17B:
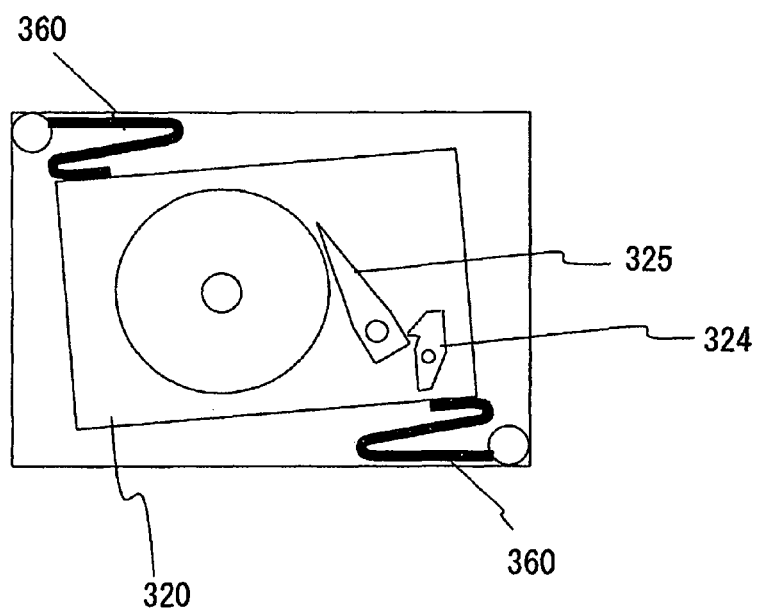
FIG. 17B is a plan view illustrating the configuration example of the holder of the magnetic storage apparatus according to the eighth embodiment.

FIGS. 17A and 17B are perspective views illustrating the configuration of a holder of the magnetic storage apparatus according to the eighth embodiment. According to the eighth embodiment, an elastic blade spring 360 is disposed on one diagonal of the magnetic storage apparatus instead of the shock absorbing material foam rubber that is used as the holding members in the first to seventh embodiments. As illustrated in FIG. 17A, the blade spring 360 is disposed on the corner parts on the upper left and lower right of the drawing of the magnetic storage apparatus 320. The blade spring 360 on the upper left of the drawing is configured to push downward of the drawing the corner part on the upper left of the magnetic storage apparatus 320 when a predetermined shock is applied. The blade spring 360 on the lower right of the drawing is configured to push upward of the drawing the corner part on the lower right of the magnetic storage apparatus 320 when a predetermined shock is applied.

By placing the blade spring 360 in this way, when a shock is applied to the magnetic storage apparatus 320, each of the blade springs 360 pushes the corner part of the magnetic storage apparatus 320 as in FIG. 17B. This enables the magnetic storage apparatus 320 to rotate counterclockwise. Note that a coil spring and volume spring can be used instead of the blade spring 360. Moreover, a damper combining such spring and viscous fluid can also be used.

Note that it is needless to say that the present invention is not limited to the above embodiments, but various design variations can be made. Furthermore, it is needless to say that above embodiments can be combined with each other.

This application claims priority rights based on the Japanese Patent Application No. 2008-071437 filed in Japan on Mar. 19, 2008, the entire disclosure of which is hereby incorporated by reference herein.

INDUSTRIAL APPLICABILITY

The present invention can be applied to a holder of a magnetic storage apparatus that holds the magnetic storage apparatus to a housing, and a magnetic storage apparatus and an electronic device including the same.

The invention claimed is:

1. A holder of a magnetic storage apparatus comprising a plurality of holding members that hold at least two corner parts of the magnetic storage apparatus,
wherein for the holding members, a sum total of holding power to hold one of opposite angles of the magnetic storage apparatus is different from a sum total of holding power to hold another of opposite angles.

2. The holder of the magnetic storage apparatus according to claim 1, wherein as for the holding members, the holding members holding the opposite angles to be paired up are formed to have same hardness.

3. The holder of the magnetic storage apparatus according to claim 1, wherein for the holding members, all the holding members holding the corner parts have different hardness.

4. The holder of the magnetic storage apparatus according to claim 1, wherein the holding members are formed in different sizes.

5. The holder of the magnetic storage apparatus according to claim 1, wherein the holding members disposed on a diagonal of the magnetic storage apparatus have a same shape.

6. The holder of the magnetic storage apparatus according to claim 1, wherein the holding members disposed on one of the opposite angles and the holding members disposed on the other of opposite angles have different contact areas with the magnetic storage apparatus.

7. The holder of the magnetic storage apparatus according to claim 1, wherein the holding member comprises a spring or an elastic member.

8. The holder of the magnetic storage apparatus according to claim 1, wherein the holding member comprises foam rubber, a viscoelastic polymer material, a gel material, or a silicone polymer material.

9. The holder of the magnetic storage apparatus according to claim 7, wherein the holding member comprises a blade spring, a coil spring, or a spiral spring.

10. The holder of the magnetic storage apparatus according to claim 1, wherein
the magnetic storage apparatus and the holding members are disposed inside a case, and
the case is supported by a supporting member, the supporting member being fixed and connected to a housing of an electronic device to which the magnetic storage apparatus is mounted.

11. The holder of the magnetic storage apparatus according to claim 1, wherein the holding member is supported by a supporting member, the supporting member being fixed and connected to a housing of an electronic device to which the magnetic storage apparatus is mounted.

12. A magnetic storage apparatus unit comprising a magnetic storage apparatus and the holder according to claim 1.

13. An electronic device comprising the magnetic storage apparatus unit according to claim 12.

14. The electric device according to claim 13, wherein the electric device comprises a notebook personal computer, a music terminal, or an information terminal.

\* \* \* \* \*